United States Patent Office.

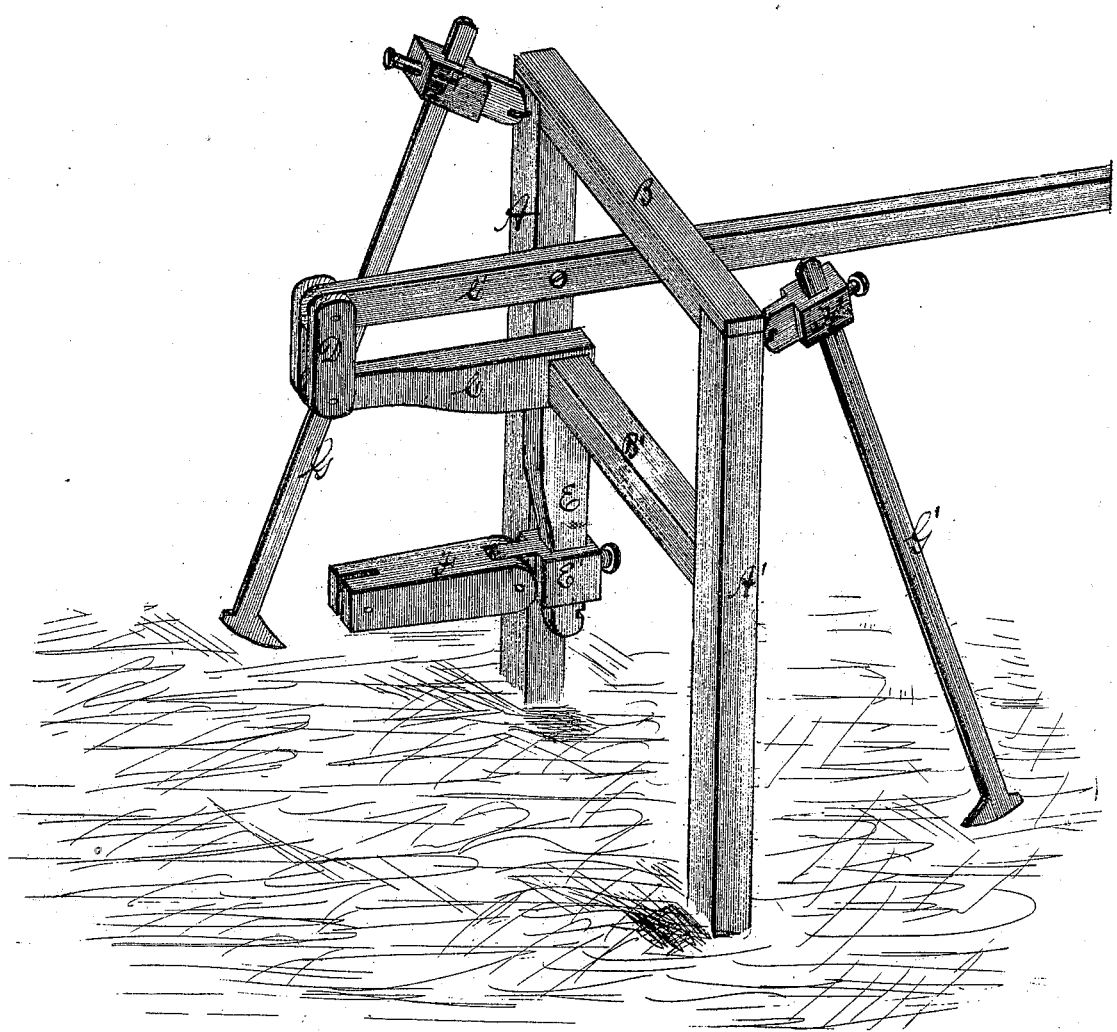

PATRICK MAGEE, OF ASSUMPTION PARISH, LOUISIANA, ASSIGNOR TO FELIX THIBODAUX, OF SAME PLACE.

Letters Patent No. 97,539, dated December 7, 1869.

IMPROVEMENT IN SAWING-MACHINE.

The Schedule referred to in these Letters Patent and making part of the same.

I, PATRICK MAGEE, of the parish of Assumption, and State of Louisiana, have invented certain Improvements in Mechanical Arrangements for Operating Crosscut and Rip-Saws, and a variety of other things, of which the following is a specification.

Nature and Objects of the Invention.

My invention relates to a novel combination of mechanical parts, which, separately considered, are each of them old, by which I obtain a means with which one man can operate any kind of saw, and a number of other things, not necessary to be specified, with more power, ease, and rapidity, than can two men by the ordinary means employed to that end, or when they are operated by hand, especially in case they are crosscut, or what are usually called rip-saws, for sawing planks out of the log by hand-power.

The object of my invention is to put it in the power of one man to saw up logs into any lengths, and to reduce them into planks, scantlings, shingles, or boards, without assistance, with more rapidity and less fatigue than if, without my invention, he were aided by one or two men; and furthermore, to have the organism, by which one man can do this, so light that it will be easily portable by the man himself.

The drawing exhibits the invention without a saw or other thing to be operated by it, and I now refer to it, the more clearly to explain its construction and operation.

A A' are two standards or posts, sharpened at their lower ends, to facilitate the driving of them in the ground, which are maintained in parallel relation to each other, by a top cross-timber, B, and a shaft, B', that is supported in proper journals, secured in them at or near the point shown on the drawing, and which are so contrived as to prevent the shaft from coming out of them.

On the shaft B', I secure a crank-arm, C, and just above, by a strong pivot-construction, a lever, C', to the post A.

I connect the lever C', with the crank-arm C, by means of a link, D, which, by a system of holes in these two parts, may be adjusted nearer the frame, if more power is required than can be attained by the arrangement as shown.

Pendent from shaft B', so as to be at right angles to crank C, I secure another crank, E, to which I attach, by means of a removable clamp, E', a pitman, F, which is connected with said clamp by a pivot-joint, as shown.

At the outer extremity of pitman F, I provide a means for securing, also by a pivot-connection, a saw, or whatever else I desire to put in motion by my machine.

In order to give steadiness to the frame, in the actual use of the invention, I provide braces G G', which I connect to the frame, and make adjustable by means of the hinged clamps or cleats H H'.

The arrangement, as shown, is designed for use in connection with crosscut-saws.

For rip-saws or other things that are operated in a vertical position, or nearly so, the frame should be so modified as to bring the crank C and lever, C', into a vertical position, whilst the crank E occupies a horizontal one, and the braces be so placed as to steady the frame, as well as the support, which, in such cases, will be required to sustain it.

My invention can be carried, by the man who wishes to use it, on his shoulders to whatever point he desires, and the posts being driven in the ground, and the braces properly adjusted, it is ready for work.

I claim, as my invention—

The combination of the frame A A and B, with braces G G', shaft B', lever C', link D, cranks C and E, clamp E', and pitman F, when all the parts are constructed, arranged, and operate as herein described for the purpose set forth.

PATRICK MAGEE.

Witnesses:
W. D. LEAVITT,
RUFUS R. RHODES.